(12) United States Patent
Patel et al.

(10) Patent No.: US 8,588,746 B2
(45) Date of Patent: Nov. 19, 2013

(54) TECHNIQUE FOR BYPASSING AN IP PBX

(75) Inventors: Dipen T. Patel, Chandler, AZ (US); John Curtis, Gilbert, AZ (US); James C. Jones, Tempe, AZ (US); Darren Cummings, Chandler, AZ (US)

(73) Assignee: SAIFE Technologies Incorporated, Chandler, AZ (US)

( * ) Notice: Subject to any disclaimer, the term of this patent is extended or adjusted under 35 U.S.C. 154(b) by 358 days.

(21) Appl. No.: 12/916,522

(22) Filed: Oct. 30, 2010

(65) Prior Publication Data

US 2011/0130121 A1    Jun. 2, 2011

Related U.S. Application Data

(60) Provisional application No. 61/256,981, filed on Oct. 31, 2009, provisional application No. 61/332,802, filed on May 9, 2010.

(51) Int. Cl.
*H04M 1/66* (2006.01)
*H04L 29/06* (2006.01)
*G06F 9/00* (2006.01)

(52) U.S. Cl.
USPC ............. 455/411; 713/153; 713/165; 726/12

(58) Field of Classification Search
USPC ........................................................ 455/411
See application file for complete search history.

(56) References Cited

U.S. PATENT DOCUMENTS

| 7,257,837 | B2 * | 8/2007 | Xu et al. .................... 726/12 |
| 7,565,539 | B2 * | 7/2009 | Agarwal .................... 713/171 |
| 2004/0117623 | A1 * | 6/2004 | Kalogridis et al. ........ 713/165 |
| 2007/0156804 | A1 * | 7/2007 | Mo ............................. 709/200 |
| 2010/0153726 | A1 * | 6/2010 | Liu et al. ................... 713/171 |

* cited by examiner

*Primary Examiner* — Charles Appiah
*Assistant Examiner* — Natasha Cosme

(57) ABSTRACT

A method for establishing communication via a VoIP network bypasses the IP PBX component conventionally used to obtain address information. Instead of obtaining the IP address from a location register of the IP PBX, the method involves use of a server configured to assign and provide to the caller's communication device a unique address (IP address/port) of a proxy. The caller then sends a Short Message Service (SMS) text message to the callee with the assigned address of the proxy. Thereafter, the caller and the callee connect at the assigned address of the proxy, thereby forming a communication path. Preferably, the devices operated by the parties are conventional smart phones. According to the preferred embodiment of the present invention, the method further comprises the steps of: determining whether to encrypt the communication; and encrypting the communication, if it is determined that the communication is to be encrypted. Preferably, the Station-to-Station (STS) protocol is used to encrypt the data packets.

19 Claims, 5 Drawing Sheets

| | |
|---|---|
| 1 | Alice generates a random elliptic curve key pair $X$ and sends the public coordinate $X_{pub}$ to Bob. |
| 2 | Bob generates a random elliptic curve key pair $Y$. |
| 3 | Bob computes the shared secret key $K$ using the Elliptic Curve Diffie-Hellman algorithm with parameters $X_{pub}$ and $Y_{private}$ such that $K = ECDH(X_{pub}, Y_{private})$. |
| 4 | Bob concatenates the public keys ($Y_{pub}, X_{pub}$) (order is important), signs them using his elliptic curve device-specific key $B_{private}$, and then encrypts them with $K$. He sends the ciphertext along with his own public coordinate $Y_{pub}$ to Alice. |
| 5 | Alice computes the shared secret key $K = ECDH(Y_{pub}, X_{private})$ |
| 6 | Alice decrypts and verifies Bob's signature using $B_{public}$. |
| 7 | Alice concatenates the exponentials ($X_{pub}, Y_{pub}$) (order is important), signs them using her asymmetric key $A_{private}$, and then encrypts them with $K$. She sends the ciphertext to Bob. |
| 8 | Bob decrypts and verifies Alice's signature using $A_{public}$. |

FIG. 3

TECHNIQUE FOR BYPASSING AN IP PBX

CROSS-REFERENCE TO RELATED APPLICATIONS

The present application is related to and claims priority from prior provisional application Ser. No. 61/256,981 filed Oct. 31, 2009 and Ser. No. 61/331,802 filed May 5, 2010, the contents of which are incorporated herein by reference.

FIELD OF THE INVENTION

The present invention relates to a technique for bypassing an Internet Protocol PBX (Internet Protocol Private Branch Exchange) to achieve greater security.

BACKGROUND

Conventionally, a VoIP (Voice over Internet Protocol) telephone system includes one or more phones (e.g., SIP phones, VoIP phones, soft phones) that are coupled to an IP PBX (Internet Protocol Private Branch Exchange). The IP PBX delivers voice over a data network and is usually interoperable with the Public Switched Telephone Network (PSTN). Clients register with the IP PBX, and when a call is made, a request is sent to the IP PBX to establish the connection. The PBX includes a location register with information relating to all phones/users registered with the IP PBX. When a call is initiated, the IP PBX uses the corresponding caller IP address from the location register to connect via either a VoIP service provider or a VoIP gateway (for calls over the PSTN).

However, this conventional approach to VoIP is not very secure. In particular, it is possible for the IP PBX to be compromised. For example, an adversary might get a hold of the IP PBX server, and obtain useful information to identify persons using the system. Where the IP PBX is used for a particular purpose, such information could be used to determine who is using it for this purpose. Furthermore, if the IP PBX is used by a particular organization, the adversary could draw a connection between the individuals who were identified and the organization. Where persons are operating clandestinely, such a security breach could have severe consequences.

SUMMARY OF THE INVENTION

A method for establishing communication via a VoIP network that bypasses the IP PBX component conventionally used to obtain address information is provided. Instead of obtaining the IP address from a location register of the IP PBX, the method involves use of a secure server configured to assign and provide to the caller's communication device a unique address (IP address/port) of a proxy. The caller's device then sends a Short Message Service (SMS) text message to the callee's device with the assigned address of the proxy. Thereafter, the caller and the callee connect at the assigned address of the proxy, thereby forming a communication path. Preferably, the devices operated by the parties are conventional smart phones.

Preferably, the initiation request sent to the server includes an authentication token. Preferably, the address of the proxy is received from the server, responsive to the initiation request, only if the server, using the authentication token, authenticates the device operated by the first party. Preferably, the message further includes an authentication token. Preferably, the connection with the second party at the address of the proxy occurs only if, using the authentication token, the device operated by the second party authenticates the device operated by the first party.

According to the preferred embodiment of the present invention, the method further comprises the steps of determining whether to encrypt the communication; and encrypting the communication, if it is determined that the communication is to be encrypted. Preferably, encrypting the communication includes negotiating an encryption scheme to use. Preferably, encrypting the communication includes encrypting data packets using the Station-to-Station (STS) protocol.

These and other aspects, features, and advantages of the present invention will become apparent from the following detailed description of preferred embodiments, which is to be read in connection with the accompanying drawings.

BRIEF DESCRIPTION OF THE DRAWINGS

FIG. 3 shows a flow chart illustrating a technique for encrypting data packets to ensure confidential communication;

DETAILED DESCRIPTION

Figure 1:
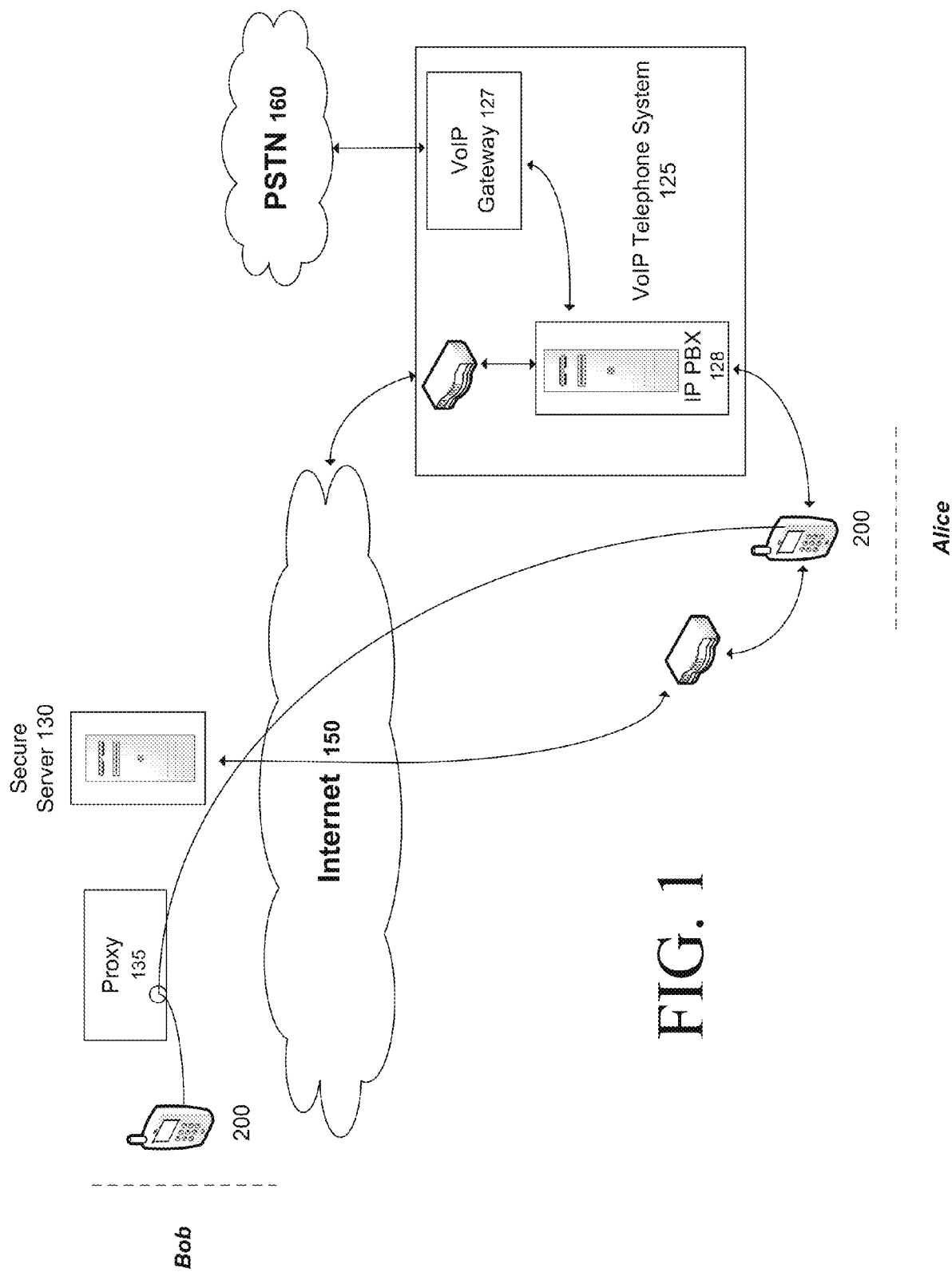
FIG. 1 shows an exemplary diagram of a VoIP system wherein communication is accomplished using a technique for bypassing an IP PBX.

FIG. 1 shows an exemplary diagram of a VoIP system wherein communication is accomplished using a technique for bypassing an IP PBX. As depicted in FIG. 1, a first party, referred to herein as "Alice", uses a communication device 200, such as a smart phone, to establish communication with a second party, referred to herein as "Bob", having a similar such communication device 200. As is known in the art, an IP PBX such as the IP PBX 128, includes a location register with information relating to all phones/users registered with the IP PBX 128. Conventionally, when a call is initiated, the IP PBX 128 would use the corresponding caller IP address from the location register to connect via either a VoIP service provider or the VoIP gateway 127 (for calls over the PSTN 160). As will be described in greater detail, the present invention allows the communication device 200 of Alice to bypass the IP PBX 128 to establish communication with the communication device 200 of Bob.

According to the systems and methods of the present invention, communication is accomplished using a technique in which a Secure Server 130 acts as a "match maker" between the communication devices 200. More particularly, the Secure Server 130 arranges for a proxy server 135 to be available at which both the parties can rendezvous. Because both the first party and the second party will be connected to the same IP address and port (of the proxy server 135), a communication path can be established between them.

Figure 2:
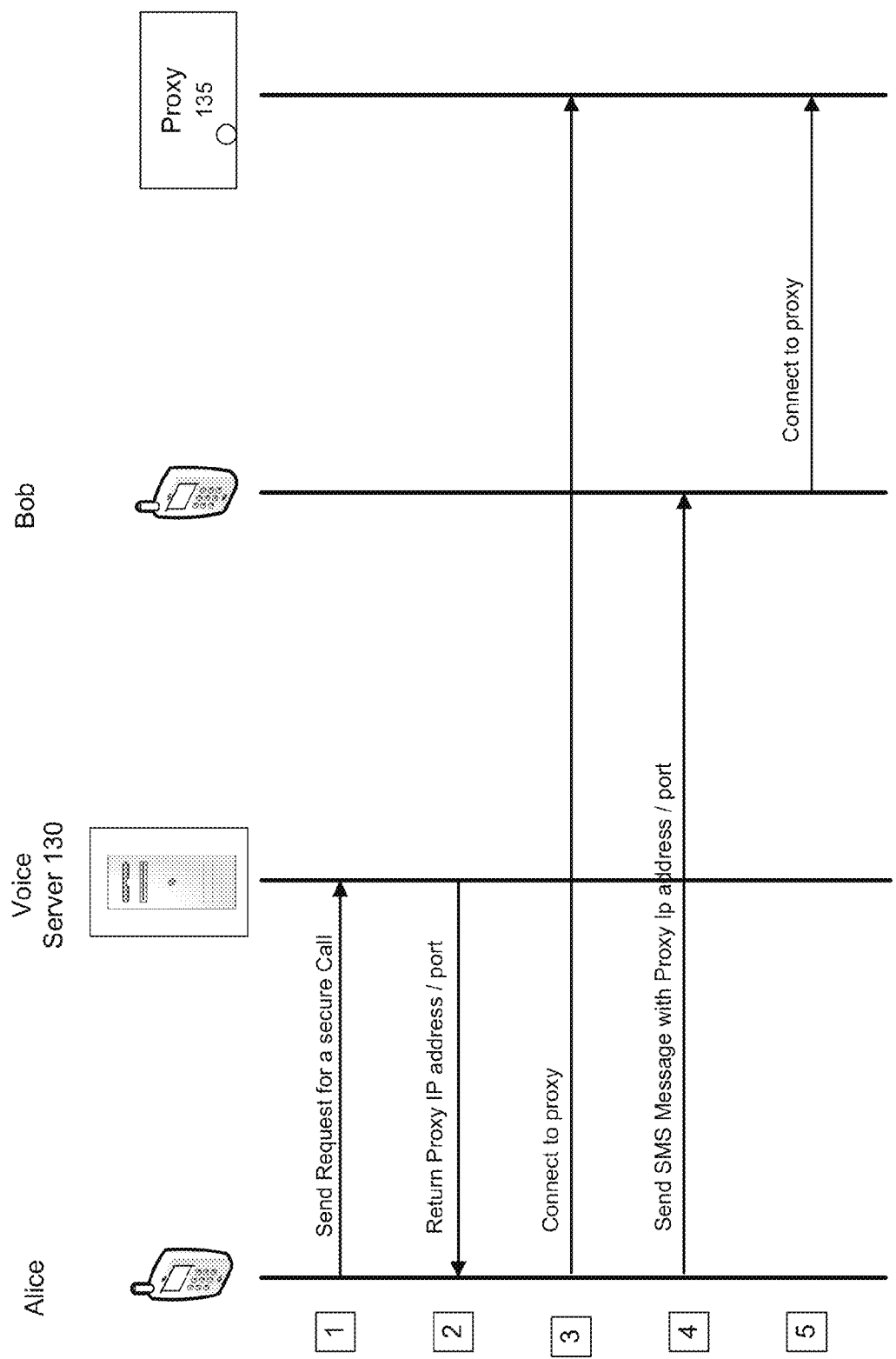
FIG. 2 shows a sequence diagram illustrating an example of the technique for bypassing an IP PBX.

It is to be understood that the exemplary VoIP system shown in the drawings and described herein is provided for illustrative purposes, and is not meant to be limiting. For example, while FIGS. 1 and 2 show only two parties engaging in communication, it is to be understood that a VoIP system of the sort useable in conjunction with the present invention would be able to accommodate many more users concurrently. Additionally, it is to be understood that while only one IP PBX is shown, the network would include many more. Furthermore, it is to be understood that although the present discussion relates to examples of voice communication, other modes of packet-based communication (e.g., video, text) could also be supported.

FIG. 2 shows a sequence diagram illustrating an example of the technique for bypassing an IP PBX. As shown in FIG. 2, initially, (step 1) Alice's communication device 200 sends a request to the Secure Server 130 to initiate secure communication. Then, (step 2) after Alice is authenticated by the Secure Server 130, Alice is provided by the Secure Server 130 with an IP address and a port where it has made a proxy 135 available that listens for incoming voice connections. Then, (step 3) Alice's communication device 200 connects to the provided IP address and port. Next, (step 4) Alice sends an SMS message containing the IP address and port of the proxy that was provided to it by the Voice Server, and an authentication token, to Bob. Finally, (step 5) using the authentication token, Bob authenticates Alice then proceeds to connect to the proxy's IP address and port. Because both Alice and Bob are now connected to the same IP address and port, a communication path can be established between Alice and Bob.

Advantageously, this technique does not require (persistent) storage of the IP address of the communication device 200 of either party on any component of the network. Moreover, Alice never obtains the IP address of Bob, and the Bob never obtains the IP address of Alice. Furthermore, if the Secure Server 130 itself is compromised, the only information available would be the IP addresses of the current users of the server. In any case, once it is determined that the Secure Server 130 has been compromised, any identifying information will be automatically flushed. Because the Secure Server 130 does not require a location register, it does not have information as to every user of the system. Moreover, interrogation of any of the communication devices would not yield the IP addresses of persons for whom calls were made. This is accomplished because the technique described herein does not require the IP address of the other party.

Continuing with the example, with reference to FIG. 3, Alice and Bob can, optionally, choose to have their voice communication encrypted.

The encryption scheme described herein is based upon the Station-to-Station (STS) protocol. See, Diffie, W.; van Oorschot, P. C.; Wiener, M. J. (1992), "Authentication and Authenticated Key Exchanges", *Designs, Codes and Cryptography*, which is incorporated by reference. However, it is to be appreciated that other suitable encryption schemes can be used. Furthermore, it is to be understood that the parties can negotiate a mutually agreeable scheme during the initial handshake.

The following steps describe the STS protocol using Elliptic Curve cryptography and make the assumption that both sides already know each others' public keys. If a step fails, the protocol stops immediately. Initially, (step 1) Alice generates a random elliptic curve key pair X and sends the public coordinate $X_{pub}$ to Bob. Next, (step 2) Bob generates a random elliptic curve key pair Y. Then, (step 3) Bob computes the shared secret key K using the Elliptic Curve Diffie-Hellman algorithm with parameters $X_{pub}$ and $Y_{private}$ such that $K=ECDH(X_{pub}, Y_{private})$. Next, (step 4) Bob concatenates the public keys $(Y_{pub}, X_{pub})$ (order is important), signs them using his elliptic curve device-specific key $B_{private}$, and then encrypts them with K. He sends the ciphertext along with his own public coordinate $Y_{pub}$ to Alice. Then, (step 5) Alice computes the shared secret key $K=ECDH(Y_{pub}, X_{private})$ Next, (step 6) Alice decrypts and verifies Bob's signature using $B_{public}$. Then, (step 7) Alice concatenates the exponentials $(X_{pub}, Y_{pub})$ (order is important), signs them using her asymmetric key $A_{private}$ and then encrypts them with K. She sends the ciphertext to Bob. Finally, (step 8) Bob decrypts and verifies Alice's signature using $A_{public}$. Alice and Bob are now mutually authenticated and have a shared secret. This secret, K, can then be used to encrypt further communication.

Figure 4:
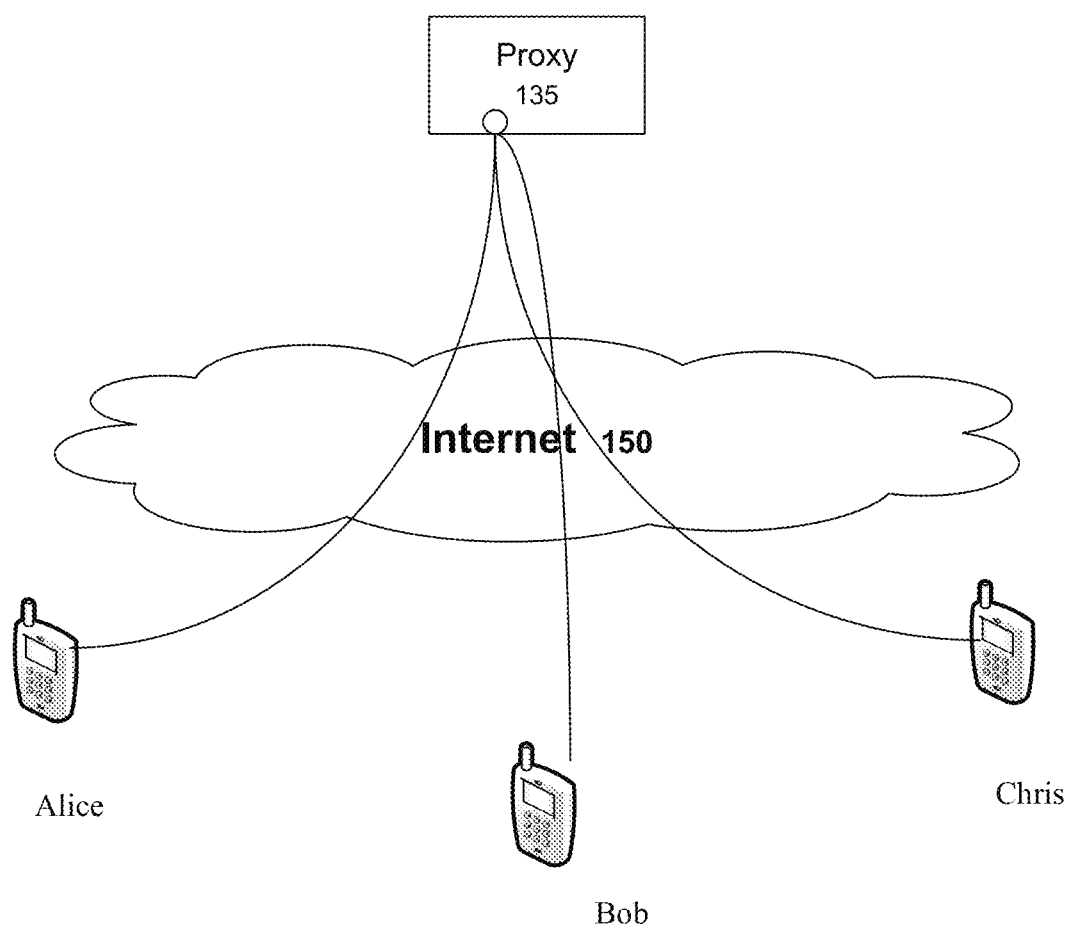
FIG. 4 shows an exemplary diagram of a VoIP system wherein group communication is accomplished using the technique for bypassing an IP PBX.

FIG. 4 shows an exemplary diagram of a VoIP system wherein group communication is accomplished using the technique for bypassing an IP PBX. As illustrated in FIG. 4, a group call between Alice, Bob, and Chris is made by each of the parties rendezvousing at the same address/port of the proxy 135. As with the example provided above, Alice (assuming Alice is the one initiating the group call) would contact the Secure Server 130 to obtain the address/port of the proxy 135. In the case of the group call, in addition to sending an SMS message to Bob, Alice could also send the SMS message to Chris. Alternatively, Bob could forward an SMS message to Chris once he has received the address information from Alice. In either case, each of the parties would "meet" at the proxy 135 to engage in group communication.

Figure 5:
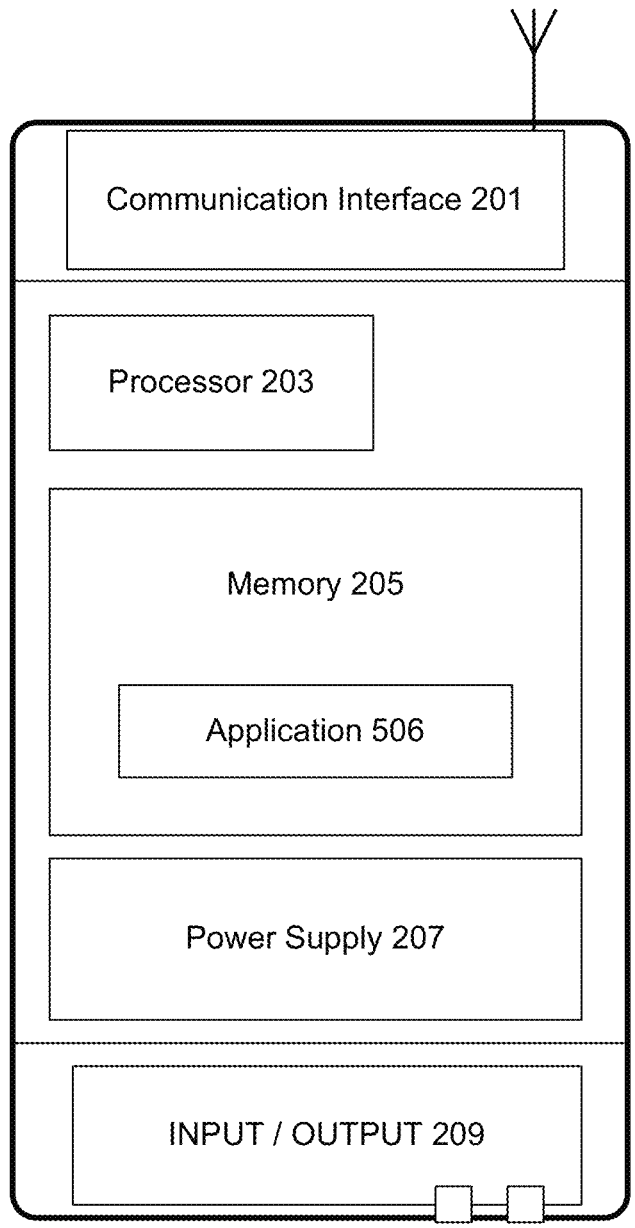
FIG. 5 shows a block diagram of an exemplary communication device useable in conjunction with the present invention.

FIG. 5 shows a block diagram of an exemplary communication device 200 useable in conjunction with the present invention. Preferably, the communication device 200 is a smart phone capable of wirelessly sending and receiving voice data packets via a wireless communication network (e.g., a cellular network) for voice communication, and which supports SMS text messaging and allows Internet access. As depicted, the communication device 200 includes a communication interface 201, a processor 203, a memory 205 (including an application 506 stored therein), a power supply 207 (e.g., a lithium-ion battery), and an input/output 209 (e.g., one or more USB ports, a QWERTY keyboard/touch screen equivalent). Representative communication devices 200 useable in conjunction with the present invention include the BLACKBERRY line of smart phones by Research In Motion, Ltd, of Waterloo, Ontario; the iPHONE smart phones by Apple Computer, Inc., of Cupertino, Calif.; the DROID, RIZR Z8, RIZR Z10, Q9c smart phones by Motorola, Inc., of Schaumburg, Ill.; the Palm line of smart phones, by Palm, Inc., of Sunnyvale, Calif.; the E51, E71, E72, E90 COMMUNICATOR, N82, N95, and N96 smart phones by Nokia Corporation, of Espoo, Finland; the TOUCHPRO, TYTN, and TYTN II smart phones by HTC Corporation, of Taiwan; the GLOFISH X500 smart phone by E-TEN Information Systems Co., Ltd., of Taiwan; the CT810 INCITE by LG Corporation, of Seoul, South Korea; the BLACKJACK, OMNIA, SCH-I730, SCH-I760, and SCH-I900 smart phones by Samsung Group, of Seoul, South Korea; the LOBSTER 700TV smart phone/TV by Virgin Mobile, PLC, of London, United Kingdom; the IPAQ smart phone by Hewlett-Packard Company, of Palo Alto, Calif.; the PORTEGE G900 smart phone by Toshiba Corporation, of Tokyo, Japan; and the P990, W95oI, W960I, and X1 smart phones by Sony Ericsson, of London, United Kingdom.

A notable feature of the present invention is that readily available "smart phone" devices can be used to ensure end-to-end encryption for secure transmission of classified information. Traditionally, National Security Agency (NSA) Type 1 devices were used for such purposes. However, such NSA Type 1 wireless communications devices are generally large, bulky, easily recognized and limited as to the particular wireless networks in which they can operate. Additionally, NSA Type 1 devices are expensive, non-discreet, and incompatible with the rapidly changing mobile handset market. The encryption scheme used herein is based on the peer-to-peer model. Advantageously, the present system can provide security at a very high level (including the secure transmission of classified information) but does not require any special purpose user communication devices. The only requirement is for a user of the system is to have a smart phone that has loaded in its memory 205 software capable of (for initiating a call) establishing an authenticated session with the Secure Server 130, negotiating with the Secure Server 130 regarding the rendezvous point, relaying this information to the callee via an SMS message, and performing the peer-to-peer encryption in conjunction with the other party's communication device; and (for receiving the call) receiving the SMS message, connecting with the caller at the rendezvous point, and performing the necessary steps of the encryption process.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for establishing communication between a first party and a second party, comprising:
    using a device operated by the first party,
        sending an initiation request to a server, the initiation request for initiating a connection with the second party;
        receiving, from the server, responsive to the initiation request, an address of a proxy;
        sending a message to a device operated by the second party, the message including the address of the proxy;
        connecting with the device operated by the second party, at the address of the proxy; and
        wherein the address of the device operated by the second party is not revealed to the device operated by the first party or the server.

2. The method of claim 1, wherein the message is sent using a different communication protocol from any communication protocol used in the other steps.

3. The method of claim 2, wherein the message is a text message sent using Short Message Service (SMS).

4. The method of claim 1, wherein the address of the proxy includes both the Internet Protocol (IP) address and port of the proxy.

5. The method of claim 1, wherein the communication is established over a public telephony network.

6. The method of claim 5, wherein the public telephony network includes a voice-over Internet protocol (VoIP) network.

7. The method of claim 1, wherein the device operated by the first party is a smart phone.

8. The method of claim 1, wherein the device operated by the second party is a smart phone.

9. The method of claim 1, wherein the initiation request sent to the server includes an authentication token.

10. The method of claim 9, wherein the address of the proxy is received from the server, responsive to the initiation request, only if the server, using the authentication token, authenticates the device operated by the first party.

11. The method of claim 1, wherein the message further includes an authentication token.

12. The method of claim 11, wherein the connection with the second party at the address of the proxy occurs only if, using the authentication token, the device operated by the second party authenticates the device operated by the first party.

13. The method of claim 1, further comprising:
    determining whether to encrypt the communication; and
    encrypting the communication, if it is determined that the communication is to be encrypted.

14. The method of claim 13, wherein encrypting the communication includes negotiating an encryption scheme to use.

15. The method of claim 13, wherein encrypting the communication includes encrypting data packets using the Station-to-Station (STS) protocol.

16. A system for establishing communication between a first communication device and a second communication device, via a VoIP network, comprising:
    the first communication device;
    the second communication device;
    a Voice server; and
    a proxy;
    wherein, in operation, the first communication device sends an initiation request to the Voice server;
    the Voice server, responsive to the initiation request, provides an address of the proxy;
    the first communication device sends an SMS message to the second communication device, the SMS message including the address of the proxy;
    the first communication device and the second communication device form a communication path by each connecting to the proxy at the address of the proxy; and
    wherein the address of the device operated by the second party is not revealed to the device operated by the first party or the server.

17. The system of claim 16, wherein, once the communication path is formed, the communication is encrypted.

18. The system of claim 17, wherein encrypting the communication includes encrypting data packets using the Station-to-Station (STS) protocol.

19. The system of claim 16, wherein the first communication device and the second communication device are smart phones.

* * * * *